(12) United States Patent  
Reid

(10) Patent No.: US 6,749,250 B1  
(45) Date of Patent: Jun. 15, 2004

(54) TAILGATE COVER

(76) Inventor: Robert F. Reid, 17634 W. Babbitt Dr., Surprise, AZ (US) 85374

( * ) Notice: Subject to any disclaimer, the term of this patent is extended or adjusted under 35 U.S.C. 154(b) by 0 days.

(21) Appl. No.: 10/638,800

(22) Filed: Aug. 12, 2003

(51) Int. Cl.[7] .............................................. B62D 33/03
(52) U.S. Cl. ................................ 296/136.07; 296/57.1; 40/591
(58) Field of Search ...................... 296/21, 57.1, 136.07; 40/591

(56) References Cited

U.S. PATENT DOCUMENTS

| 2,168,048 A | 7/1939 | Fritsch |
| 4,346,529 A | 8/1982 | Keller |
| 5,255,464 A | 10/1993 | Marecek |
| 5,893,226 A | 4/1999 | Sophocleous et al. |
| D433,457 S | 11/2000 | Linton |
| 6,217,958 B1 | 4/2001 | Blyden et al. |
| 6,484,427 B1 * | 11/2002 | Santa Cruz et al. ........... 40/591 |

* cited by examiner

*Primary Examiner*—Dennis H. Pedder

(57) ABSTRACT

A tailgate cover includes a flexible panel having a first side, a second side, a first edge, a second edge, a third edge and a fourth edge. The first and second edges are positioned opposite of each other. A bisecting line extends through the first and second edges and divides the panel into a first portion and a second portion. Each of a first elongated strap and a second elongated strap is attached to and extends along a length of a respective one of the first and second edges such that a respective first portion and a second portion of the first and second straps is defined. The first side of the panel is positionable on a tailgate. A securing assembly releasably secures the first and second portions of the first strap together and the first and second portions of the second strap together.

11 Claims, 4 Drawing Sheets

TAILGATE COVER

BACKGROUND OF THE INVENTION

1. Field of the Invention

The present invention relates to vehicle coverings and more particularly pertains to a new vehicle covering for removably positioning on the tailgate of a vehicle for protecting and enhancing the aesthetics of the tailgate.

2. Description of the Prior Art

The use of vehicle coverings is known in the prior art. U.S. Pat. No. 5,255,464 describes a device that is positionable on a tailgate and secured along a bottom,edge of the tailgate. This type of device is difficult to put on and the type of fastening used does not prevent it from shifting left and right or bunching up along the middle of the tailgate. Other devices, such as the one found in U.S. Pat. No. 5,893,226 is positionable on different areas of the vehicle but is not generally intended for use while driving.

While these devices fulfill their respective, particular objectives and requirements, the need remains for a device that is positionable on a tailgate in such a manner that is simple to use and which will remain in position, stretched across a width of the tailgate while the vehicle, on which the tailgate is mounted, is driven.

SUMMARY OF THE INVENTION

The present invention meets the needs presented above by providing a panel that is attached to a tailgate by extending the panel around the side edges of the tailgate. This keeps the panel extended along the width of the tailgate and prevents its movement even during high winds associated with customary driving conditions.

Another object of the present invention is to provide a new vehicle covering that includes elastic straps along the edges of the panel for aiding in the positioning and securing of the panel on the tailgate. The elastic nature of the straps keeps the panel in a taught state.

To this end, the present invention generally comprises a flexible panel having a first side, a second side, a first edge, a second edge, a third edge and a fourth edge. The first and second edges are positioned opposite of each other. The panel has a generally rectangular shape. A bisecting line extends through the first and second edges and divides the panel generally into a first portion and a second portion, Each of a first elongated strap and a second elongated strap is attached to and extends along a length of a respective one of the first and second edges such that a respective first portion and a second portion of the first and second straps is defined. The first side of the panel may be positioned on a tailgate such that the bisecting line is positioned on an upper edge of the tailgate. A securing assembly releasably secures the first and second portions of the first strap together and the first and second portions of the second strap together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

Figure 1:
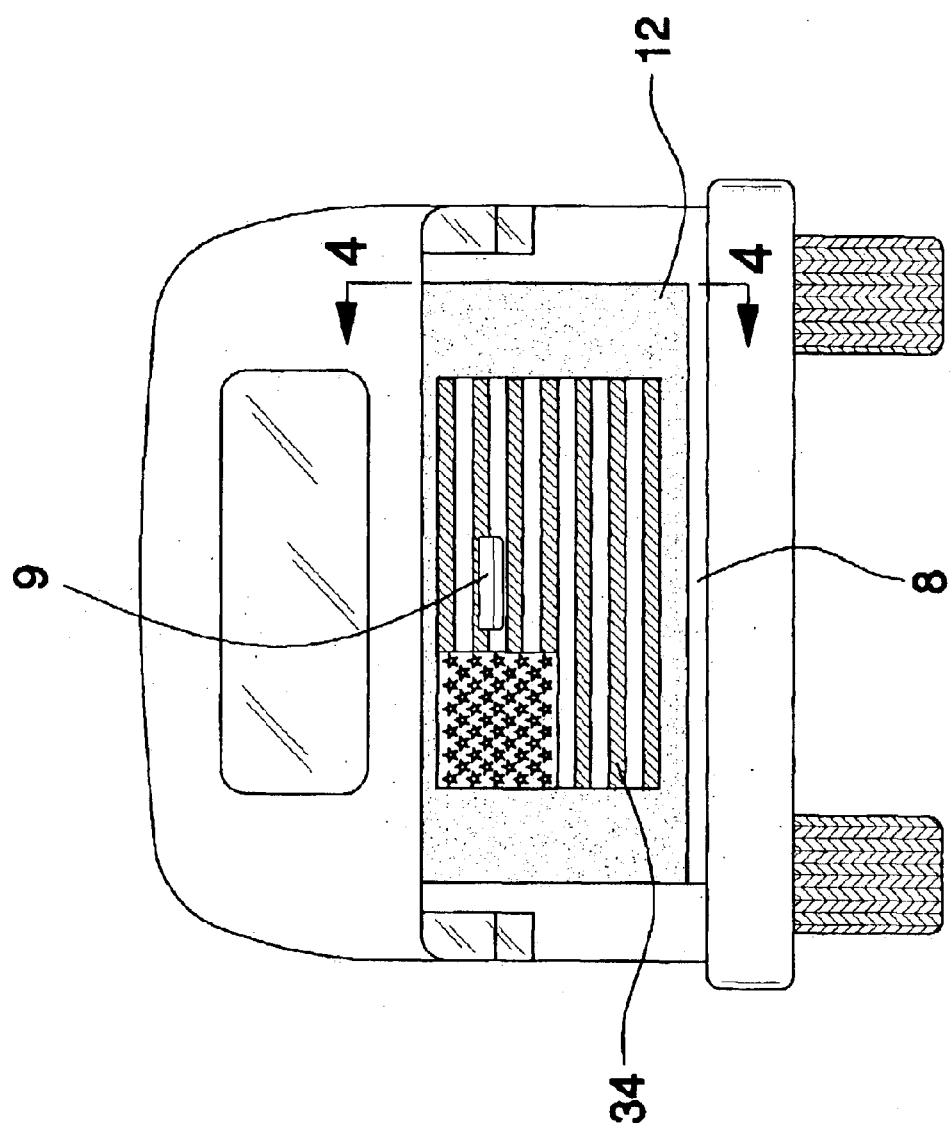
FIG. 1 is a schematic front view of a tailgate cover according to the present invention.
Figure 2:
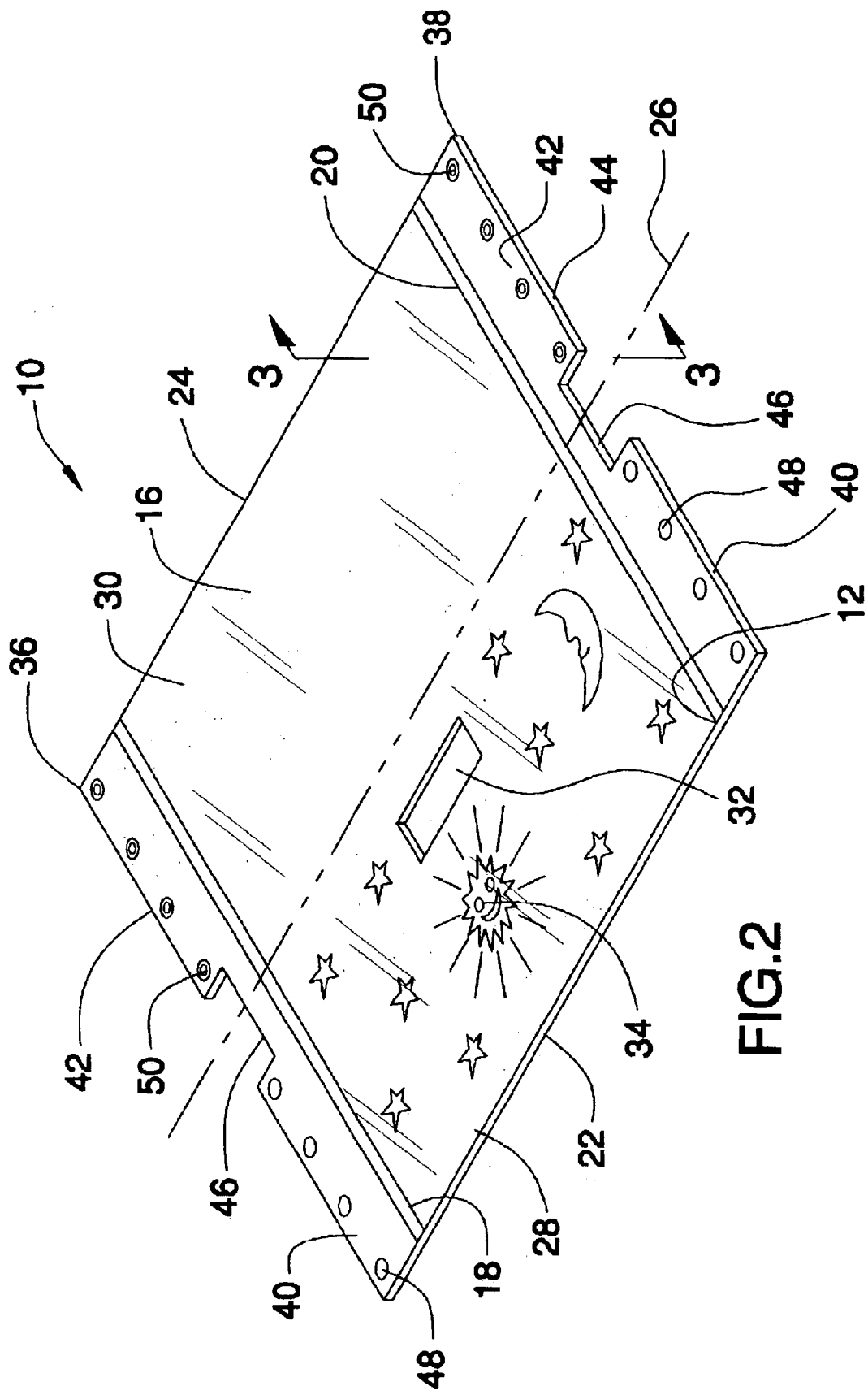
FIG. 2 is a schematic perspective view of the second side of the present invention.
Figure 3:
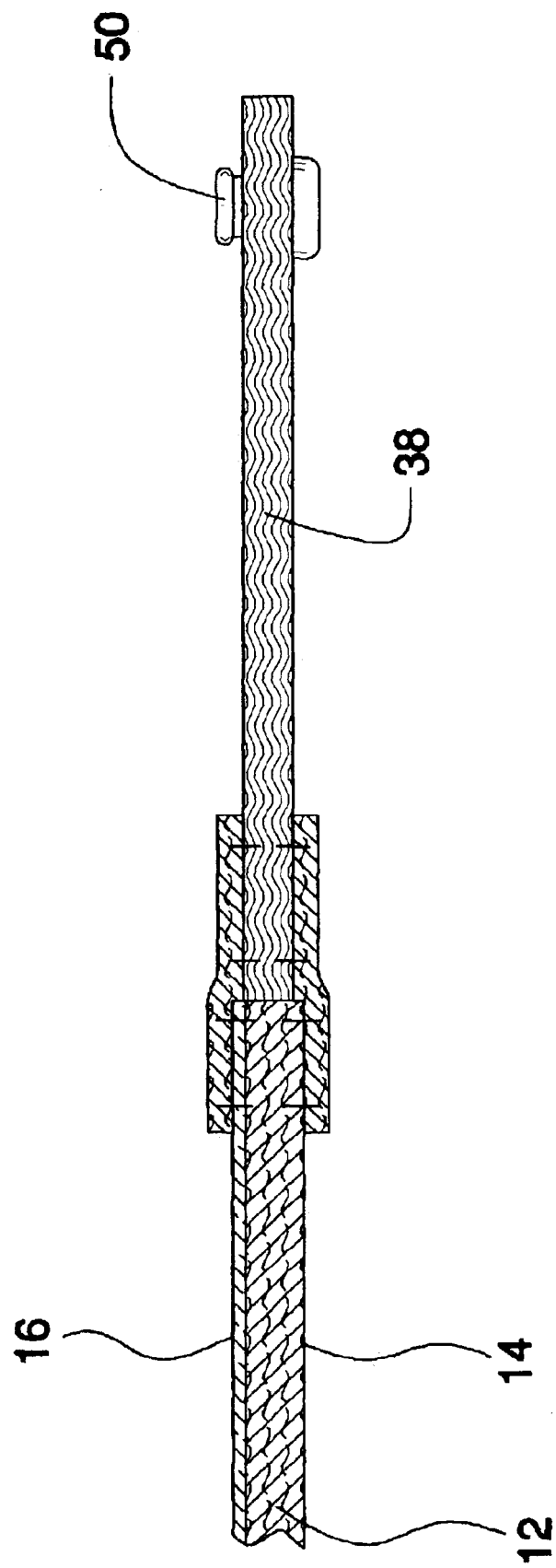
FIG. 3 is a schematic cross-sectional view taken along line 3—3 of FIG. 2 of the present invention.
Figure 4:
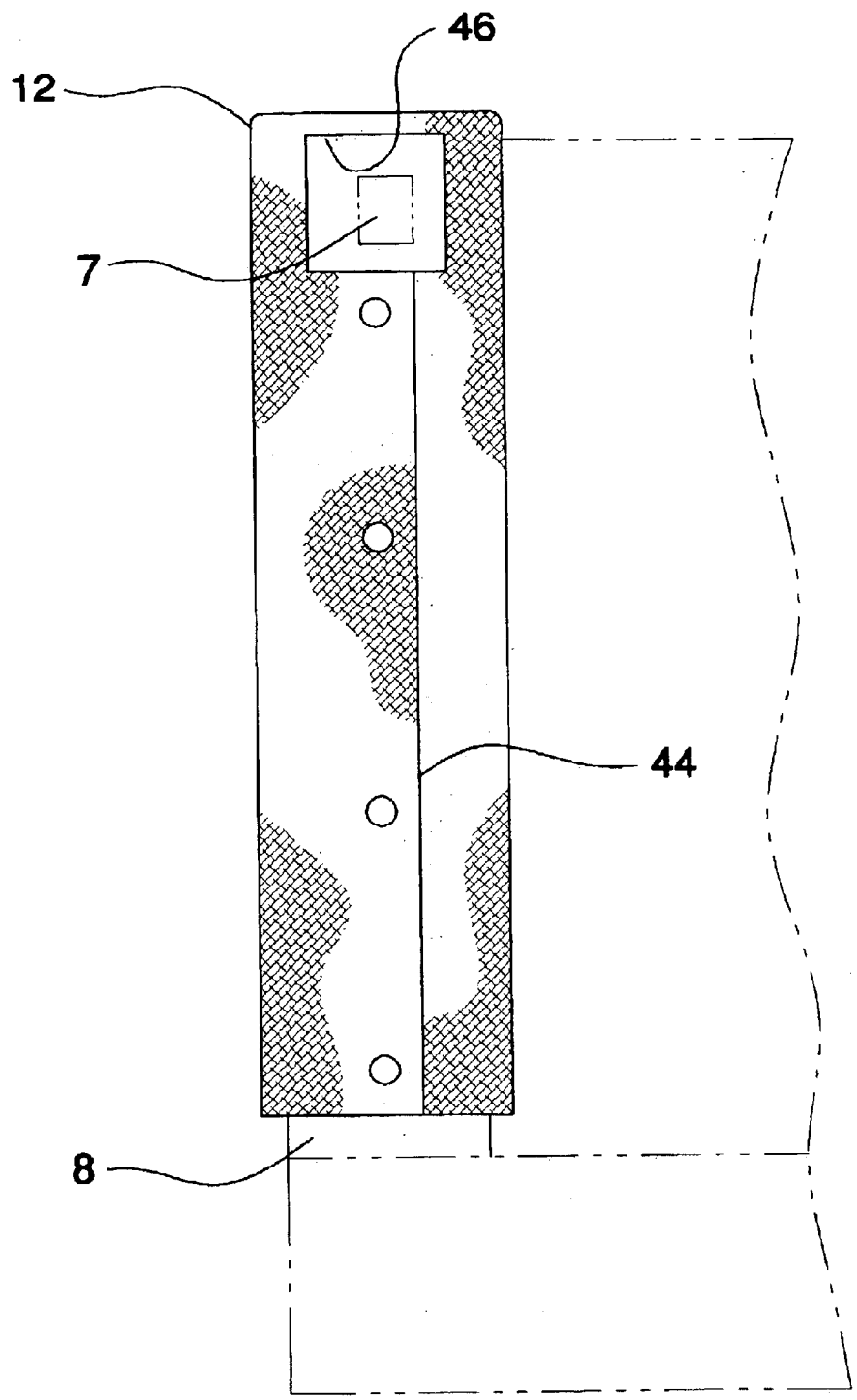
FIG. 4 is a schematic side view of the present invention.

DESCRIPTION OF THE PREFERRED EMBODIMENT.

With reference now to the drawings, and in particular to FIGS. 1 through 4 thereof, a new vehicle covering embodying the principles and concepts of the present invention and generally designated by the reference numeral 10 will be described.

As best illustrated in FIGS. 1 through 4, the tailgate cover 10 generally comprises a device which is removably positionable over a vehicle tailgate 8. The device, or cover 10, includes a flexible panel 12 having a first side 14, a second side 16, a first edge 18, a second edge 20, a third edge 22 and a fourth edge 24. The first 18 and second 20 edges are positioned opposite of each other. The panel 12 has a generally rectangular shape. A bisecting line 26, shown only for reference purposes, extends through the first 18 and second 20 edges and generally divides the panel 12 into a first portion 28 and a second portion 30. The first portion 28 has an opening 32 extending therethrough. The opening 32 is positioned generally between the first 18 and second 20 edges and nearer the bisecting line 26 than the third edge 22. The opening is for accessing the handle 9 of the tailgate 8. The first side 14 of the panel 12 comprises a cloth material. The second side 16 of the panel 12 preferably comprises a vinyl material and has design indicia 34 positioned thereon.

Each of a first elongated strap 36 and a second elongated strap 38 is attached to and extends along a length of a respective one of the first 18 and second 20 edges such that a respective first portion 40 and a second portion 42 of the first 36 and second 38 straps is defined. The first side 14 of the panel 12 may be positioned on the tailgate 8 such that the bisecting line 26 is positioned on an upper edge of the tailgate 8. This positions the first portions 40 of the straps 36, 38 adjacent to the second portions 42 of the straps 36, 38. Each of the first 36 and second 38 straps preferably comprises a resiliently elastic material. The first 36 and second 38 straps each have an outer edge 44 having a slot 46 extending therein. Each of the slots 46 is positioned such that the bisecting line 26 extends through each of the slots 46. The slots 46 allow for passage of the tailgate 8 catch rod 7. The first 36 and second 38 straps may either be elastic along their entire width from the panel 12 to the outer edge 44 or may be only elastic along a portion of that width.

A securing assembly releasably secures the first 40 and second 42 portions of the first strap 36 together and the first 40 and second 42 portions of the second strap 38 together. The securing assembly may include conventional securing assemblies such as hook and loop fasteners, buttons, or straps. Preferably, the securing assembly includes a plurality of conventional snap pairs. Each of the snap pairs includes a male snap 48 and a female snap 50. The male snaps 48 are each attached to the first portions 40 of the first 36 and second 38 straps. Each of the female snaps 50 is attached to the second portions 42 of the first 36 and second 38 straps. Though, it is understood that the female snaps 50 and male snaps 48 may be positioned in opposite positions as well.

In use, the panel 12 is positioned on the tailgate 8 as described above so that the cloth side of the panel is abutting the tailgate. The cloth of the first side 14 protects the tailgate 8 from scratches. The straps 36, 38 are stretched around the edges of the tailgate 8 and secured in place so that the surface of the first portions. 40 adjacent to the first side 14 are abutting the surface of the second portions 42 adjacent to the second side 16. The elastic nature of the straps 36, 38 helps to secure the panel 12 in place. The first portion 28 of the second side 16 of the panel 12 is preferably directed outwardly away from the vehicle and includes the design indicia 34 as shown in FIG. 1.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate covering device for removably positioning over a vehicle tailgate, said device comprising:

a flexible panel having a first side, a second side, a first edge, a second edge, a third edge and a fourth edge, said first and second edges being positioned opposite of each other, said panel having a generally rectangular shape, a bisecting line extends through said first and second edges and divides said panel generally into a first portion and a second portion;

a first elongated strap and a second elongated strap, each of said first and second straps being attached to and extending along a length of a respective one of said first and second edges such that a respective first portion and a second portion of said first and second straps is defined, wherein said first side of said panel may be positioned on the tailgate such that the bisecting line is substantially aligned along an upper edge of the tailgate; and a securing assembly for releasably securing said first and second portions of said first strap together and said first and second portions of said second strap together and said securing assembly being attached to said first and second straps.

2. The tailgate covering device of claim 1, wherein said first portion has an opening extending therethrough, said opening being positioned generally between said first and second edges and nearer said bisecting line than said third edge.

3. The tailgate covering device of claim 1, wherein said first side of said panel comprising a cloth material, said second side of said panel comprising a vinyl material.

4. The tailgate covering device of claim 1, wherein each of said first and second straps comprises a resiliently elastic material.

5. The tailgate covering device of claim 4, wherein each of said first and second straps has an outer edge having a slot extending therein, each of said slots being positioned such that said bisecting line extends through each of said slots.

6. The tailgate covering device of claim 2, wherein each of said first and second straps has an outer edge having a slot extending therein, each of said slots being positioned such that said bisecting line extends through each of said slots.

7. The tailgate covering device of claim 1, wherein each of said first and second straps has an outer edge having a slot extending therein, each of said slots being positioned such that said bisecting line extends through each of said slots.

8. The tailgate covering device of claim 1, wherein said securing assembly includes a plurality of snap pairs, each of said snap pairs including a male snap and a female snap, each of said male snaps being attached to said first portions of said first and second straps, each of said female snaps being attached to said second portions of said first and second straps.

9. The tailgate covering device of claim 4, wherein said securing assembly includes a plurality of snap pairs, each of said snap pairs including a male snap and a female snap, each of said male snaps being attached to said first portions of said first and second straps, each of said female snaps being attached to said second portions of said first and second straps.

10. The tailgate covering device of claim 5, wherein said securing assembly includes a plurality of snap pairs, each of said snap pairs including a male snap and a female snap, each of said male snaps being attached to said first portions of said first and second straps, each of said female snaps being attached to said second portions of said first and second straps.

11. A tailgate covering device for removably positioning over a vehicle tailgate, said device comprising:

a flexible panel having a first side, a second side, a first edge, a second edge, a third edge and a fourth edge, said first and second edges being positioned opposite of each other, said panel having a generally rectangular shape, a bisecting line extends through said first and second edges and divides said panel generally into a first portion and a second portion, said first portion having an opening extending therethrough, said opening being positioned generally between said first and second edges and nearer said bisecting line than said third edge, said first side of said panel comprising a cloth material, said second side of said panel comprising a vinyl material;

a first elongated strap and a second elongated strap, each of said first and second straps being attached to and extending along a length of a respective one of said first and second edges such that a respective first portion and a second portion of said first and second straps is defined, wherein said first side of said panel may be positioned on the tailgate such that the bisecting line is substantially aligned along an upper edge of the tailgate, each of said first and second strips comprising a resiliently elastic material, each of said first and second straps having an outer edge having a slot extending therein, each of said slots being positioned such that said bisecting line extends through each of said slots; and a securing assembly for releasably securing said first and second portions of said first strap together and said first and second portions of said second strap together, said securing assembly including a plurality of snap pairs, each of said snap pairs including a male snap and a female snap, each of said male snaps being attached to-said first portions of said first and second straps, each of said female snaps being attached to said second portions of said first and second straps.

* * * * *